May 19, 1970      L. S. SIEGEL      3,512,286

IDENTIFYING CREDIT CARD

Filed Sept. 7, 1967

INVENTOR.
LOUIS S. SIEGEL
BY
ATTORNEY

United States Patent Office 3,512,286
Patented May 19, 1970

---

3,512,286
IDENTIFYING CREDIT CARD
Louis S. Siegel, Brooklyn, N.Y., assignor to Dubow Chemical Corporation, New Hyde Park, N.Y., a Corporation of New York
Filed Sept. 7, 1967, Ser. No. 666,036
Int. Cl. G09f 3/02
U.S. Cl. 40—2.2         3 Claims

---

ABSTRACT OF THE DISCLOSURE

An identifying credit card, a portion of whose surface is depressed to define a well adapted to receive a photograph of the owner, the card being formed of thermoplastic material and having a shoulder surrounding said well to accommodate a panel of transparent, thermoplastic material whose margins are bonded to said shoulder to seal and protect said photograph.

---

This invention relates generally to credit cards, and more particularly to an identifying credit card which incorporates a photograph of the owner to prevent fraudulent use thereof.

Increasingly, use is being made of credit cards rather than cash for travel, entertainment and variety of other purposes. An owner of a credit card need carry only a limited supply of funds, for with a recognized card he is able to obtain airplane and train tickets, to pay restaurant and entertainment bills, and to rent cars and boats. In recent years, it has become possible for a credit card owner to travel internationally and to meet all expenses which he encounters without the need for money. Moreover, some credit cards provide check-cashing privileges and other useful services.

The principal danger involved in credit cards lies in fraudulent use thereof. Should a credit card be lost or stolen and wrongfully used, it is possible for enormous debts to be incurred before the card is invalidated or the fraud detected. The sole means presently provided for quickly identifying the true owner of a card is his authorized signature, which appears on the face of the card. But signatures are not too difficult to simulate, and when a purchase is made with a credit card and the signature on the sales slip is forged, the seller will often not be able to detect the spurious signature, or he may neglect carefully to compare the authorized signature with the one on the slip.

The owner of a credit card is protected against fraudulent use only as of the time he gives notice to the credit card company regarding the loss or theft of his card. Should he fail to give such notice, he may be held liable for the fraudulent use of his card. But in any event, the credit card company may suffer serious losses, for even after notification, all the company can do to prevent misuse of a credit card is to notify all establishments which honor its cards, that the card in question is invalid. Since cards are honored throughout the world, it is obvious that a considerable delay may occur before notification is fully effective.

Clearly the greatest measure of security is gained if the nature of the credit card is such as to identify positively the rightful owner, so that the likelihood of the card being honored when in possession of one not the owner is minimized. As pointed out previously, a signature may be simulated without difficulty by a skillful forger. But a forger is not ordinarily able to assume the appearance of the true owner of the card. Moreover, while it is not hard to fake some one else's signature, a person's appearance cannot be readily altered to resemble another.

Accordingly, it is the main object of this invention to provide an identifying credit card which incorporates a photograph of the owner.

More specifically, it is an obpect of the invention to provide a card of the above-identified type wherein alteration, removal or replacement of the photograph is rendered difficult if not impossible, without detection.

Also an object of the invention, is to provide an identifying card of the above type wherein the photograph of the owner may be incorporated therein efficiently and at relatively low cost.

Briefly stated, these objects are accomplished in a credit card of thermoplastic material having a depression therein to define a well adapted to receive a photograph of the owner, the well being surrounded by a shoulder forming a frame to encompass a transparent window of flexible thermoplastic material whose margins are bonded to the shoulder to seal in said photograph and to protect it against mutilation or removal and substitution.

For a better understanding of the invention as well as further objects and features thereof, reference is made to the following detailed description to be read in conjunction with the accompanying drawing, wherein.

Figure 1:
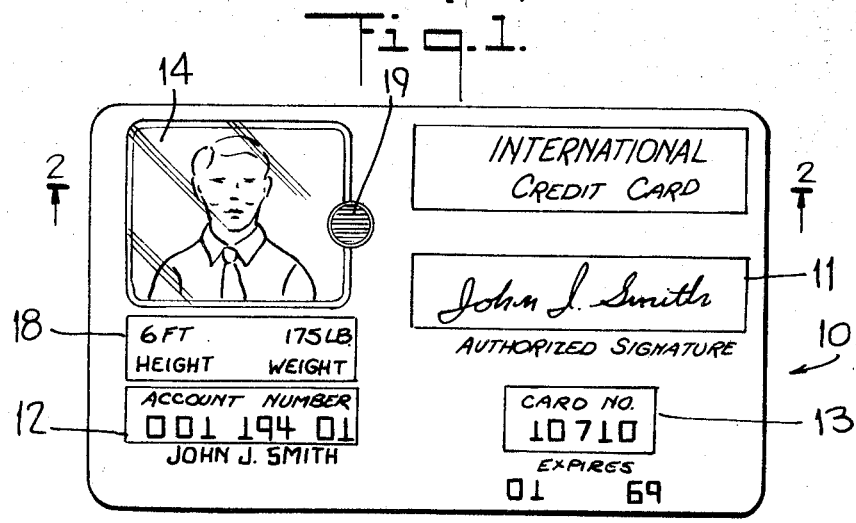
FIG. 1 is the front face of a credit card having a photograph incorporated therein to identify the owner.
Figure 2:
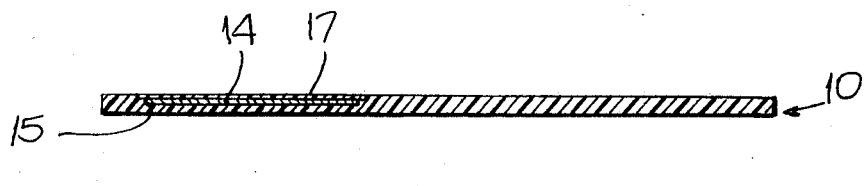
FIG. 2 is a longtudinal section taken through the card in the plane indicated by line 2—2 in FIG. 1.
Figure 3:
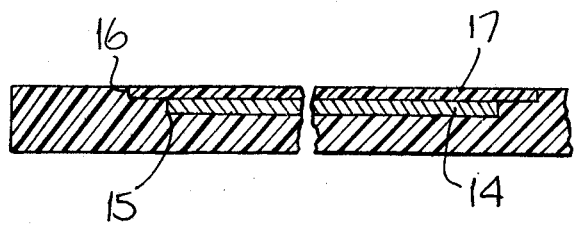
FIG. 3 is an enlarged sectional view of the depressed area of the card.
Figure 4:
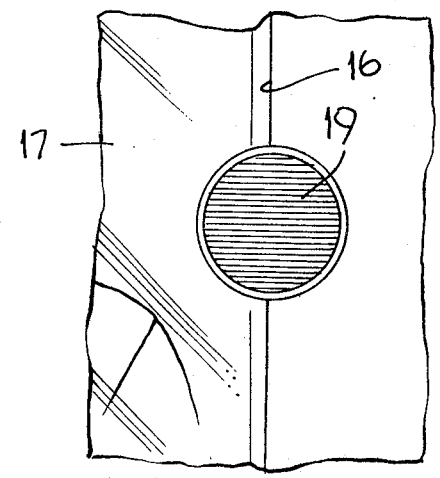
FIG. 4 shows an embossing seal for preventing substitution of the photograph.

Referring now to FIG. 1 there is shown a rectangular credit card 10 formed of a single-ply or multi-ply, high strength thermoplastic material, such as vinyl, cellulose acetate, nylon or Mylar (ethyl glycol terephthalate). The card has various block-like areas for identifying data. Thus the authorized signature of the owner appears in a block 11 having a nonerasable surface, his account number in block 12, and the card number in block 13. Below the account number is printed the name of the owner, and below the card number is printed the expiration date of the card.

The printed name and the various numbers appearing on the card are embossed therein to faciliate processing by addressing machines. In completing a transaction with the credit card, the card is placed in an addressing machine and the positively embossed information thereon is brought to bear on a manifold sales slip, thereby printing on the top sheet of the slip, the same data being duplicated on the sheets therebelow.

The only means presently available for quickly determining whether the holder of a card is the true owner thereof, is by way of the authorized signature. One who presents a card to be honored, is required to sign the sales slip. This signature is then compared by the seller with the authorized signature on the card. As was explained previously, most sellers are careless in this regard or lack the skill to detect a false signature. As a consequence, fraudulent use is widespread and losses resulting therefrom amount to millions of dollars a year.

In accordance with the invention, a small photograph 14 of the owner is incorporated in card 10 in such a way as not to interfere with the normal use to which the card is put. It is important, since the card is positively embossed and has raised areas providing alpha-numeric infomation, that the photograph not be raised above the surface of the card. To this end, formed in the card adjacent one corner thereof, is a rectangular depression defining a well 15 for accommodating the photograph, which in practice may be a standard sixteen-millimeter size.

When the photograph is placed in the well, it is preferably adhered by an epoxy cement or other means to the floor of the well, whereby removal of the photograph cannot be readily effected without detection. The border of the well has a shoulder 16 forming a rectangular frame for accommodating a clear panel or window 17 of thermoplastic material, which is heat-sealed at its margin to the shoulder. This panel may be made of one-half mil Mylar or other high-strength transparent material which serves to protect the underlying photograph without impairing the view thereof.

The depth of the well and that of the shoulder relative to the thicknesses of the photograph and of the window, are such that the surface of window 17 is exactly flush with that of the card so that the photograph is effectively integrated therewith.

Thus when the card is presented, the recipient is able to compare the appearance of the bearer with the photograph, as well as to check the signature of the bearer. Below the photograph, one may also inscribe in a block 18, the weight and height of the owner, on the same type of non-erasable surface as is presently used for the authorized signature, thereby providing a further check on the identification of the true owner.

The only real danger of fraudulent misuse is when the card is tampered with, and a false photograph substituted. This would be difficult, for it would require careful removal of the window and photograph without mutilating the card. Also, the individual using the card with a substituted photograph would have to more or less satisfy the weight and height indicia thereon. However, as a further precaution, the card may be negatively embossed by heat and pressure with a seal 19 overlapping the marginal area of the photograph so that by the use of sinuous depressions bridging the photograph and the adjacent card area, the substitution of a photograph would be immediately apparent in the seal area.

Since the card is thermoplastic, the depression and shoulder therein may be formed by a heated die. The bonding of the window to the shoulder may also be effected by heat and pressure so that it becomes difficult to remove the window without mutilating the card. Alternatively, the floor of the depressed well may be rendered photosensitive for direct printing of an imagine thereon by known contact printing techniques. The credit card because of the photo incorporated therein also serves as an identification card.

While there has been shown and described a preferred embodiment of identifying credit card in accordance with the invention, it will be appreciated that many changes and modifications may be made therein without, however, departing from the essential spirit of the invention as defined in the annexed claims. Thus while a rectangular well and photograph have been shown, it will be appreciated that these may be oval or in some other form.

What I claim is:

1. An identification credit card comprising:
   (A) a card of flexible thermoplastic material having planar top and bottom surfaces and having an area thereon on the top surface of the card for receiving the authorized signature of the owner as well as positively embossed alpha-numeric identifying data, raised with respect to said surface,
   (B) said card having a negatively embossed depression therein below said top surface to define a well, said depression having a marginal shoulder,
   (C) a photograph set into said well to identify the owner, and
   (D) a clear window of flexible thermoplastic material overlying said photograph and marginally heat-sealed to said shoulder to cause said window to be flush with said top surface.

2. A card as set forth in claim 1, having a seal negatively embossed in an area overlapping said photograph to certify the authenticity thereof.

3. A card as set forth in claim 1, wherein said material is Mylar.

References Cited

UNITED STATES PATENTS

| | | | |
|---|---|---|---|
| 147,289 | 2/1874 | Smith | 283—7 X |
| 751,247 | 2/1904 | Behrendt | 283—7 |
| 2,165,250 | 7/1939 | George | 40—158 |
| 2,512,106 | 6/1950 | Langan | 40—158 |
| 2,604,710 | 7/1952 | Beaune | 40—2.2 |
| 2,835,993 | 5/1958 | Whitehead | 40—2.2 |
| 2,984,030 | 5/1961 | Hannon | 40—2.2 |
| 3,224,130 | 12/1965 | Seigh | 40—158 |
| 3,267,599 | 8/1966 | Anderson et al. | 40—158 |
| 3,357,121 | 12/1967 | Dorman | 40—158 |

EUGENE R. CAPOZIO, Primary Examiner

W. J. CONTRERAS, Assistant Examiner

U.S. Cl. X.R.

40—158